United States Patent [19]

Wegmann

[11] Patent Number: 4,658,098

[45] Date of Patent: Apr. 14, 1987

[54] CIRCUIT ARRANGEMENT FOR TELECOMMUNICATIONS SWITCHING SYSTEMS, PARTICULARLY TELEPHONE SWITCHING SYSTEMS, COMPRISING INFORMATION-PROCESSING CENTRAL SWITCH DEVICES AND SUB-CENTRAL SWITCHING FACILITIES WHICH SUPPLY THE SAME WITH INFORMATION

[75] Inventor: Gerhard Wegmann, Munich, Fed. Rep. of Germany

[73] Assignee: Siemens Aktiengesellschaft, Berlin and Munich, Fed. Rep. of Germany

[21] Appl. No.: 865,754

[22] Filed: May 22, 1986

[30] Foreign Application Priority Data

Jun. 25, 1985 [DE] Fed. Rep. of Germany ....... 3522721

[51] Int. Cl.$^4$ ............................................ H04M 3/36
[52] U.S. Cl. .................................... 379/113; 379/138
[58] Field of Search .................... 179/8 A, 10, 9, 7 R, 179/7.1 R, 7.1 TP, 18 ES, 8 R

[56] References Cited

U.S. PATENT DOCUMENTS 4,399,332 8/1983 Furlan et al. ........................ 179/8 A
4,603,233 7/1986 Englert et al. ...................... 179/8 A

*Primary Examiner*—Gene Z. Rubinson
*Assistant Examiner*—David R. Schuster
*Attorney, Agent, or Firm*—Hill, Van Santen, Steadman & Simpson

[57] ABSTRACT

Call-associated series of information-processing requests, accepted in decentralized switching facilities, are composed of initial switch identifiers which arrive first and of successor switch identifiers arrive following thereupon and are transmitted to a central switch mechanism from the switching facilities which are present in a greater plurality. A measuring device which continuously determines the loadability of a switching circuit periodically and continuously adjust the comparison standard of a counter, which only counts the initial switch identifiers in successfully following time intervals, perceives a pending overload situation for the switching circuit on the basis thereof and, in order to avoid the same, transmits non-acceptance data to the switching facilities in which, a portion of the received occupations are subjected to non-acceptance in accordance with accordingly stored non-acceptance rates. After a rest interval of the non-acceptance events due to a temporarily lower load, initialization of a renewed formation and transmission of the non-acceptance data occurs on the basis of the threshold pertaining to the number of initial switch identifiers incoming to the switching circuit per time unit, this threshold being continuously adjusted by way of measured loadability results which are derived in measuring time intervals which compensate unsteady low fluctuations from full load, actual load and actual numbers of initial switch identifiers per measuring time interval.

3 Claims, 1 Drawing Figure

CIRCUIT ARRANGEMENT FOR TELECOMMUNICATIONS SWITCHING SYSTEMS, PARTICULARLY TELEPHONE SWITCHING SYSTEMS, COMPRISING INFORMATION-PROCESSING CENTRAL SWITCH DEVICES AND SUB-CENTRAL SWITCHING FACILITIES WHICH SUPPLY THE SAME WITH INFORMATION

BACKGROUND OF THE INVENTION

1. Field of the Invention

The present invention relates to a circuit arrangement for telecommunications switching systems, particularly telephone switching systems, comprising information-processing, central switch devices and sub-central switching facilities which continuously supply the same with series of information processing requests, whereby, in particular, the first information-processing requests of every series is composed of an initial switch identifier. The circuit arrangement comprises non-acceptance devices respectively holding back, in particular rejecting, a portion of the series of information-processing requests based on the measure of an adjustable non-acceptance rate, these non-acceptance devices being respectively adjustable to a determining non-acceptance rate by way of non-acceptance data which are formed in a switch device from continuously acquired initial switch identifier counter results and/or load measurement results and are only transmitted to the switching facilities when the number of information-processing requests, in particular initial switch identifiers, supplied to the switch device exceeds a threshold, and the formation and/or transmission thereof being, in turn, terminated when, particularly after the non-acceptance rate has again reached the value zero.

2. Description of the Prior Art

A circuit arrangement of the general type set forth above is already known from the German published application No. 33 28 571 which discloses a load measurement device which enables the actual value of the running load of a central processor to be continuously identified. This value is supplied to a counter which acquires initial switch identifiers which arrive in the processor. As known, an initial switch identifier is always a first of a respective series of switch identifiers, whereby a series encompasses a sequence of interrelated switch identifiers; these can, for example, be respectively all switch identifiers which belong to a respective call setup, i.e. occupation identifiers (also referred to as "call signals"), dial information (numerals of a multi-digit call number), end of dialing identifiers, answer identifiers, end identifiers, fee charge information and the like. All of these switch identifiers are acquired in the switching facilities and are transmitted to the central processor, representing information-processing requests for the latter. Since, per call, they arrive successively and with, in part, greater chronological intervals from one another, they arrive at the central processor unsystematically time interleaved.

Among other things, there are two basic requirements for a central processor. It should be loaded as well as possible, i.e. all of the arising information-processing requests, it should execute as many as possible, hopefully all. However, it must also be protected against an overload, so that the information-processing procedures sequencing therein which the processor has already begun can occur in proper time and can be executed without disturbance (for example, an overfilling of what is referred to as an input list must also be prevented). For this purpose, the load supplied to the central processor may have to be limited such that a number of series of information-processing requests are rejected overall so that the remaining series of information-processing requests, i.e. information-processing requests that are always interrelated series wise, for example, belong together in call association, can be executed completely, time-suited and undisturbed. These two requirements run contrary to one another. The load of the central processor, i.e. its practical exploitation, should be as high as possible; overloads, however, should thereby be avoided with optimally-high reliability. Meeting this requirement is made complicated by the unsystematic, constant fluctuations in the load of the central processor, which fluctuations occur over and over again and are randomly caused. In addition to a clear and steady, rising or falling tendency which would still be relatively easy to govern in terms of control engineering, the load behavior can exhibit a discontinuously-rising tendency, a tendency which rises discontinuously for only a short time (load peaks), a gradually rising tendency, and the like.

In order to govern this multitude of load behavior modes, the initially set forth circuit arrangement provides, among other things, a counter which only acquires the initial switch identifiers in time segments from the information-processing requests incoming to the central processor. Since each of these always represents the beginning of respective information-processing requests (successor switch identifiers) which will not arrive successively until the next few seconds, the behavior of the incidence of initial switch identifiers always, so to speak, previews the behavior of the information-processing load that will fall to the central processor in the coming seconds. This can be advantageously influenced relatively early by warding off overload by way of non-acceptance procedures with non-acceptance measures likewise described on the basis of the circuit arrangement initially set forth, these being executed by way of the central processor (central switch device) as well as the group processors (decentralized switch facilities).

For comparing the tendency of the load development in the central processor which is even already forseeable to a certain degree in the manner set forth to the momentary actual load of the central processor, the circuit arrangement described in the aforementioned German application includes a load measuring device with which a deviation of the momentary load from a reference value (for example 95%) coming close to the 100% value is measured. When such a deviation exists, then the load measuring device outputs an increase signal to the counter given too low a load and outputs a reduction signal to the counter given too high a load, whereby a comparison value stored in the counter (control standard) is respectively somewhat increased or reduced. This comparison value therefore indicates the number of initial switch identifiers per time unit, for example per second, which, together with the successor switch identifiers appertaining thereto in the described manner (as explained, a series of call-associated information-processing requests is always composed, for example, of an initial switch identifier and of a plurality of successor switch identifiers), result in a load in the central processor at the provided level of, for example, 95% under the respectively momentary loadability conditions. On the basis of the indicated increase or, respectively, decrease of the comparison value, the running comparison of the initial switch identifiers to a comparison value is always based on an updated comparison value. The fluctuations thereof which result from the fluctuations in the loadability of the processor are caused in that the composition of information-processing requests of various types during the ongoing operation of a central processor can shift in the daily cycle and/or in the weekly cycle and/or in the annual cycle as well. Under the assumption that the central processor is the central processor of the telephone switching system, it can therefore occur, for example, that it is predominantly local calls that are to be set up at certain times of the day, whereas it is predominantly long-distance calls that are to be setup at certain other times of the day. The same can also be observed with respect to various days of the week (working days or, respectively, Sundays and holidays). Furthermore, it can also occur that more short-duration calls take place at certain times of the day or on certain days and more long-duration calls occur at other times of the day or, respectively, on other days. It can also occur that more special services are used at certain times of the day and at other times of the day. It can also occur that the proportion of prematurely aborted call set up operations is higher at certain times of the day. The same is also always true regarding different days (working days or Sundays and Holidays). Differences can also occur when the network is operated at nominal load, high load or even an overload, the number of incomplete connections being thereby particularly increased. Consequently, the loadability (number of processible sequences of information-processing requests) of a central processor is not constant.

In the relationships which have been set forth, the beginning of non-acceptance measures in response to a rise in the load is the critical point. The described devices must react sensitively enough so that the most accurate possible control of the non-acceptance rate is possible in the overload situation. This sensitivity and accuracy, however, can also disadvantageously lead to useless, even injurious nonacceptance procedures in time of low processor load in which nonacceptances are not necessary at all, indeed are even unwanted. Randomly caused, short-duration and, therefore, still completely harmless load peaks could lead to non-acceptances which would, in fact, not yet have been necessary at all. In order to avoid this, a circuit arrangement of the aforementioned German application provides that the formation of non-acceptance data be ended after a load-parrying phase when the non-acceptance rate has remained at the value zero for the duration of a waiting interval. A special threshold relating to the incoming initial switch identifiers is provided for the initialization of the load defense; when the number of incoming initial switch identifiers within a defined time unit reaches this threshold, then the formation and transmission of non-acceptance data in or, respectively, from the central processor is initiated.

In the aforementioned known circuit arrangement, this threshold for avoiding an unintended initialization of the non-acceptance measures is set higher than the average value of the comparison value (control standard) effective in the counter during a load-regulating phase. It is constant in the known case. When it is set too high, then the consequence can be that an overload defense begins too late; when, by contrast, it is set too low, then the consequence can be that an overload defense begins too soon.

SUMMARY OF THE INVENTION

The object of the present invention is to provide suitable precautions for an optimum initialization of the overload defense, i.e. for the start of a load-regulating phase, which adapt this initialization as well as possible to the given operating conditions, i.e. to avoid premature non-acceptance procedures, but to also in turn exclude consequences of processor overload that was not parried and the correct time.

The above object is achieved, according to the present invention, in that the threshold which determines the initialization of the transmission of non-acceptance data is continuously adjusted by way of measured loadability result that are respectively acquired in a time interval between the decreasing of the non-acceptance rate to the value zero and a renewed transgression of this threshold, i.e. in phases when the non-acceptance procedures are idle; and in that, for the continuously repeated acquisition of such a measured loadability results within each such time interval, first, measuring time intervals are set in which the plurality of information-processing requests, in particular only the initial switch identifiers thereof, incoming per measuring time interval is respectively identified and which is dimensioned sufficiently large for the compensation of brief-duration fluctuations relating thereto in order to maintain the remaining measuring error adequately small, and, second, the identified plurality of information-processing requests, in particular only the initial switch identifiers thereof, which has arrived per measuring time interval is increased based on the measure of the relationship of a maximally-allowable traffic load in this measuring time interval to the actual traffic load resulting during this measuring time interval from the incoming information processing requests and is used for the ongoing adjustment of the threshold.

The conference paper from the Ninth International Telegraphic Congress (ITC), October 1979 in Torremolinos, Spain, by Somoza et al, Paper No. 536 (also see Electrical Communication, Vol. 55, No. 1, 1980, pp. 37–45 which is the equivalent of Elektrisches Nachrichtenwesen, Vol. 55, No. 1, 1980, Pages 37–45, and "IEEE Transactions on Communications", September 1973, pp. 1027 et seq) already discloses that a load measurement be uninterruptedly carried out in a central processor of the telephone switching system, i.e. both in time intervals of an excess offering of information-processing requests and in time intervals in which such an excess offering is not present. The result of this load measurement continuously repeated in measuring time intervals is directly used for limiting the number of incoming new occupations giving an occurring overload. In comparison thereto, the present invention proceeds on the basis that the load situation acquired in a central switch device is also evaluated there and, when needed, is communicated as a throttle instruction (not acceptance data) to the decentralized switching facilities which then undertake appropriate non-acceptance measures. As a result thereof, a throttling of the load by non-acceptance of the portion of incoming new occupations can be accomplished very early and very uniformly distributed with respect to the various switching facilities, i.e. can be accomplished with optimum effectiveness.

In order for the non-acceptance measures to only take effect when truly necessary, however, i.e. not when a slight overload appears only temporarily or when a greater overload appears for only a few brief time, the present invention proceeds on the basis of, among other things, the fact that the nonacceptance data are only transmitted from the central switch device to the decentralized switching facilities when the number of new occupations per observation interval has exceeded a threshold. This transmission of non-acceptance data and, therefore, the throttling of incoming new occupations is, in turn, terminated when, due to a drop in the number of new occupations below the value of the control standard, the non-acceptance measures have, in turn, stopped.

The threshold is an average value that has been averaged over a longer term; in the known case initially set forth, it is a constant value. In accordance with the present invention, by contrast, this average value is not a constant value but is continuously readjusted. In accordance with the invention, the continuously acquired measured results (in the last-cited of the known cases, these are measured load results and are directly employed for strottling new occupations incoming to the central switching device) are measured loadability results and are employed for the continuous readjustment of the threshold. Since these results are not directly employed for throttling, but for readjustment of the threshold, the measuring time intervals defined for their acquisition can be selected of such length that the remaining measuring error can thereby be kept correspondingly low. The loadability measurement differs from a load measurement in that what number of information-processing requests or, respectively, initial switch identifiers incoming per time unit leads to what switch mechanism load is also identified during unload conditions and that, based on a 100% switch mechanism load, a determination is made regarding what number of information processing requests or, respectively, initial switch identifiers could be maximally accepted per time unit. The readjustment of the threshold according to the present invention therefore occurs in this manner (number of new occupations and load). Given an extremely low measured load, however, the readjustment is canceled because a measuring error that would become relatively high (too high) would thereby occur.

BRIEF DESCRIPTION OF THE DRAWINGS

Other objects, features and advantages of the invention, its organization, construction and operation will be best understood from the following detailed description, taken in conjunction with the accompanying drawing, on which.

DESCRIPTION OF THE PREFERRED EMBODIMENTS

Figure 1A:
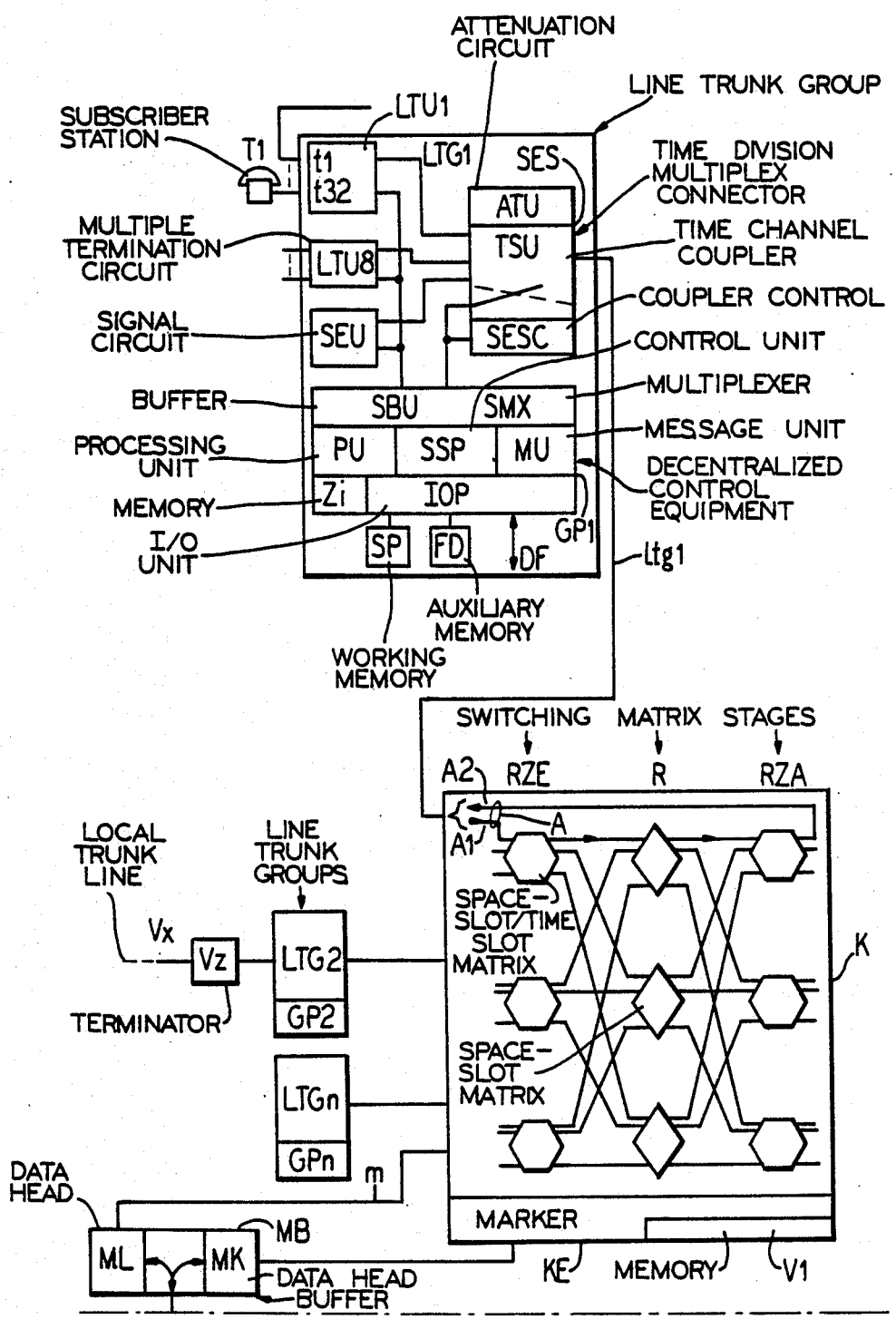
FIG. 1A and FIG. 1B together form a schematic representation of a computer-controlled telephone switching system which operates in accordance with the present invention and illustrate only those components which contribute to an understanding of the invention.
Figure 1B:
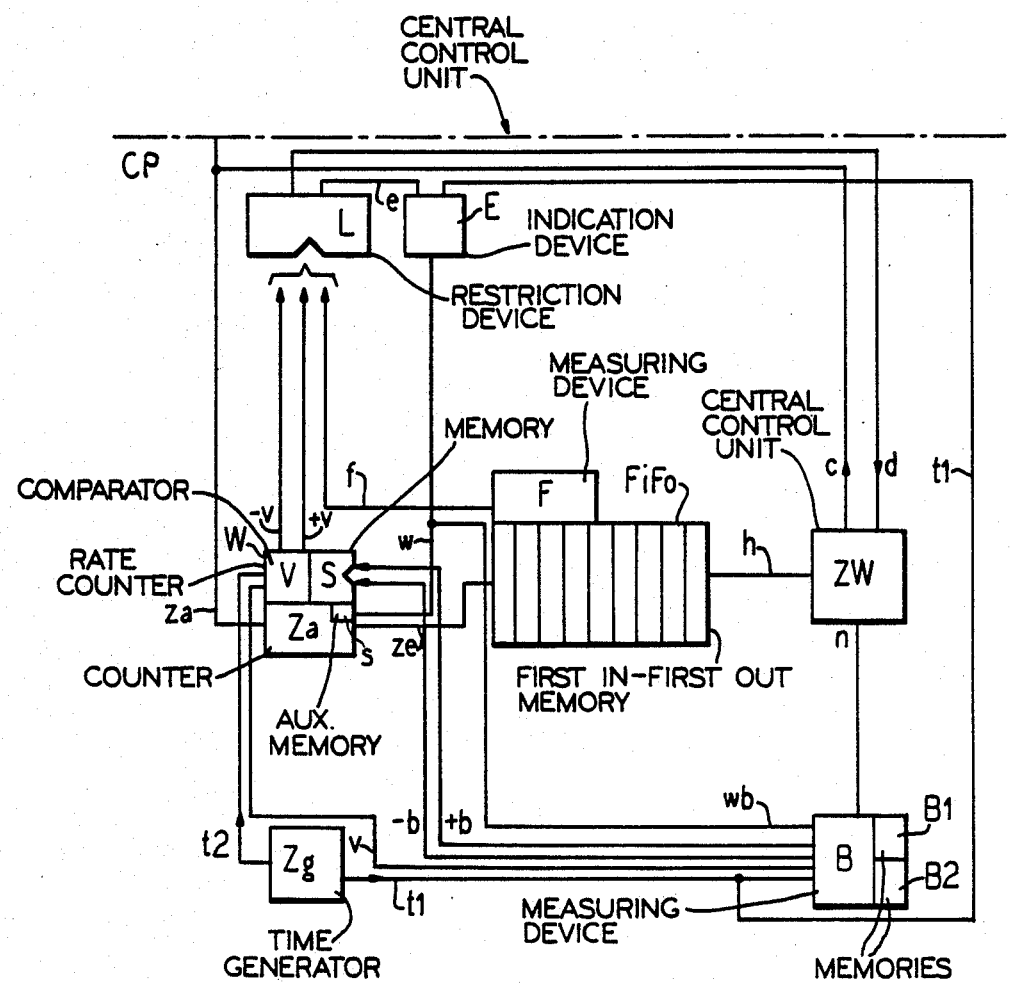

A switching matrix network constructed in three switching matrix stages RZE, R and RZA comprises a great number of switching matrix network connections at its input side, one of these connections being illustrated and referenced A. The switching matrix network is composed of a plurality of switching matrix network portions. Each of the switching matrix network connections always comprises a pair of time-division multiplex lines, whereof the one time-division multiplex line serves the purpose of signal transmission toward the switching matrix network and the other time-division multiplex line serves the purpose of signal transmission out from the switching matrix network. Accordingly, the switching matrix network connection A comprises a time-division multiplex line A1 and a time-division multiplex line A2. The respective signal transmission direction for each of these two time-division multiplex lines is indicated by appropriate arrows.

The switching matrices of the first switching matrix stage RZE are combined to time-slot/space-slot matrices, as the illustrated symbols show. The switching matrices of the center switching matrix stage R are space-slot matrices. The switching matrices of the last switching matrix stage RZA are again time-slot/space-slot matrices. A great number of the indicated matrices is provided in each switching matrix stage even though only three respective matrices of the respective type are shown per switching matrix stage. The switching matrices of the various switching matrix stages are connected to one another via links in the manner shown on the drawing. These links are time-division multiplex links. The switching matrix network connections are also of the time-division multiplex nature.

Line trunk groups, for example the line trunk group LTG1, are individually connected to the switching matrix network connections, for example the connection A, of the switching matrix network portion K, being connected thereto via time-division multiplex lines, for example the time-division multiplex line ltg1, which are respectively designed for both message transmission directions. At the input side, such a line trunk group can be connected to subscriber lines (analog and/or digital), analog trunks and pulse code modulation (PCM) trunks (alternatively as well as in combination). A subscriber station connected via a subscriber line is referenced T1. Coders, decoders, multiplexers, demultiplexers and the equipment required for a realization of what is referred to as the BORSCHT function are contained in a line trunk group (cf. NTZ, Vol. 33, No. 10, 1980, pp. 646, 652, and International Zurich Seminar on Digital Communications, Proceedings IEE Catalog No. 78 CA 1325-0 ASST, pp. B2-1, A4.1, as well as the German patent applications Nos. P 31 00 811.9, P 31 04 002.0, and P 31 06 903.7, respectively corresponding to the German Pat. Nos. DE 31 00 811 A1, DE 31 04 002 A1, and DE 31 06 903 C2).

The drawing also illustrates the line trunk group LTG1. The structure and operation thereof are described in detail in the German published application No. 28 26 113 from the bottom of Page 6. The Supplement to Vol. 4, 1981, of the periodical "telcom report" and U.S. Pat. No. 4,564,725, fully incorporated herein by this reference, may also be referred to for a description of operation. Further explanations presume familarity with the above description and are limited to those relationships which are especially significant in the present context.

A central control unit CP serves, among other things, for setting up the call connections which are to be established via the switching matrix network. It determines the switching data required for setting up each connection. As known, the switching data for a connection which is to be connected through precisely specify the route of the appertaining connection via the switching matrix network, i.e. the switching matrices and links to be traversed by the connection as well as the channels respectively occupied therein. These switching data are prepared with the assistance of the central control unit which, therefore, also includes the function of a routing device in addition to an occupation memory, and are transmitted to the switching matrix network marker KE which transmits the switching data via a buffer MB connected to the central control unit via a central data line D and serves the purpose of an intermediate memory and recoding of data as well as a matching to the transmission rates. The buffer can be limited to some of these functions or to respectively only one of these functions. Such a buffer is described in detail, for example, in the German Pat. No. 15 37 849.

In addition to the central control unit CP, a greater plurality of decentralized control equipment GP1–GPn are also shown, these being respectively individually assigned to the line trunk groups LTG1–LTGn. These control equipment serve for the execution of all switching events within each of the line trunk groups. Particularly included among the switching events are all switching exchange events within these line trunk groups. Further details concerning this operation can be derived from the aforementioned German application No. 28 26 113.

The decentralized control equipment GP1–GPn are in communication with the central control unit CP via data channels which are individually through-connected per decentralized control equipment via the switching matrix network K up to the buffer MB. A respectively separate data channel therefore leads to each of the decentralized control equipment from the buffer, namely from its data head ML. For this purpose, the buffer MB has its data head ML connected to one of the switching matrix network connections via a time-division multiplex line m. The buffer is connected to one of the switching matrix network connections of the switching matrix network in the same manner as each of the line trunk groups LTG1–LTGn. The time-division multiplex line m is therefore connected to a switching matrix network connection which comprises a time-division multiplex input to a space-slot/time-slot matrix of the first switching matrix stage and a time-division multiplex output from the space-slot/time-slot matrix of the last switching matrix stage. The time-division multiplex line m is therefore connected to a switching matrix network connection like that referenced A.

Each data connection between the data head of a buffer and each of the line trunk groups, for example the line trunk group LTG1, comprises a channel for the transmission of data from the buffer to the appertaining line trunk group and comprises a further channel for the transmission of data in the reverse direction. These two data channels lead to and from the decentralized control equipment individually assigned to the appertaining line trunk group.

The set up and maintenance of the data connection set forth, these being referred to as semi-permanent connections, via the switching matrix network occurs with the assistance of the switching matrix network marker KE in the same way as the setup and the maintenance of the message connections, for example telephone connections. For this purpose, holding memories are assigned in a known manner to the switching matrices of the switching matrix network K, the switching data respectively appertaining to a switching matrix being stored in these holding memories. What is accomplished with the assistance of these holding memories is that the required through-connections are available in the respective time slots or, respectively, the required write events and the read events for the full memory of the time slot matrices occur. All further details which relate to the structure and operation of a time-division multiplex switching matrix network are presumed here to be well known in the art and therefore are not set forth in greater detail.

As explained, the switching data required for the setup of message connections are transmitted from the central control unit to the switching matrix network marker KE via the buffer MB. Among other things, a data head MK which is assigned to the buffer MB serves this purpose. For the sake of completeness, it should be added here that a plurality of switching matrix network markers KE can also be connected to a buffer MB. These plurality of switching matrix network markers can be individually assigned to a plurality of switching matrix network portions of a larger switching matrix network. It is also possible to provide a respective switching matrix network marker per switching matrix stage.

Since the data connection set forth above between the buffer MB, via the time-division multiplex line m, to each of the line trunk groups LTG1–LTGn must be through-connected with the assistance of the switching matrix network K before the setup of message connections, for example telephone connections, can be initiated, a completely free switching matrix network is usually available for establishing these data connections, i.e. a switching matrix network in which all data channels are unoccupied. The setup of the data connections can therefore occur in accordance with an arbitrarily-defined pattern which remains unaltered for all times. It is therefore provided that the switching matrix network marker KE also contains marker data, i.e. the switching data, for the data channels stored in a memory V1 assigned to the switching matrix network marker KE. In a re-establishment of the data connection, therefore, these switching data need not be respectively newly worked up by the central control unit CP and need not be transmitted again via the buffer MB. When the data connections required between the buffer MB and the line trunk groups LTG1–LTGn, i.e. their decentralized control equipment GP1–GPn, are to be re-established via the switching matrix network K, then the central control unit CP merely outputs a corresponding instruction to the buffer MB, which the latter relays to the switching matrix network marker KE, and on the basis of the marker KE takes the switching data stored in its memory V1 in order to execute the required switching events in the individual succession in a known manner.

As already explained in the aforementioned German published application No. 28 26 113, the aforementioned data connections between the control equipment, for example GP, assigned to the line trunk groups, for example LTG1, on the one hand, on the central control unit CP, on the other hand, are also produced via the time channel coupler TSU of the line trunk group LTG1 in addition to message connections from and to subscriber stations, as well as trunk circuits. As already set forth, these data connections further proceed via the switching matrix network K and the time-division multiplex line m.

As has been set forth above, a plurality of line trunk groups LTG1-LTGn is provided in addition to the central switching matrix network K. Each of these line trunk groups is connected via a respective PCM line, for example the line ltgl, to a switching matrix network connection, for example the connection A, of the switching matrix network K, being connected thereto in the manner already set forth. Within the line trunk group, the PCM line per line trunk group leads to a line switching unit TSU whose operation and significance is described in greater detail in the aforementioned German published application No. 28 26 113. This line switching arrangement is a switching matrix subnetwork by way of which both the data connections and the connections to and from subscribers and to and from trunk circuits are through-connected. What is meant by "trunk circuit", of course, are also channels of connected PCM trunk circuits. The connection of these subscriber lines, trunk circuits and channels may be derived from the references set forth above.

Various information, for example call signals from subscriber stations which wish to set up a call, further, selection identifiers from the subscriber stations but also via trunk circuits and channels, further, line characters via trunk circuits as well as in allocation to channels, arrive via subscriber lines, trunk circuits and channels which are connected to a line trunk group at the input side. Subscriber line circuits for the connection of subscriber lines, terminator circuits for the connection of local and long-distance trunks that are occupible incoming and/or outgoing, local call switching circuits, selection receive circuits and the like are subscriber-associated and/are connection-associated switching devices.

In a known manner, then, the group control unit serve the purpose of handling the acceptance of the aforementioned, incoming connection-associated information. A group control unit also untakes a processing or a preprocessing of these accepted information in respective assignment to the appertaining subscriber line, trunk circuit or to the appertaining channel. Furthermore, a few such information are intermediately stored in the memory SP respectively individually assigned to the group control unit, being intermediately stored, in particular, with the assistance of an input/output device IOP. Furthermore, the group control unit has the task of transmitting signals and control signals for emission via these lines (subscriber lines and trunk circuits, a well as channels), for example as call pulses and call progress tone signals via subscriber lines as well as selection identifiers and line characters and the like via trunk circuits occupied in the outgoing direction.

Connections with respect to the call set up direction, both incoming from a line (subscriber line, trunk circuit or, respectively, a corresponding channel) in the direction toward the central switching matrix network K, as well as departing therefrom to such a line are connected through via the switching matrix sub-network appertaining to a line trunk group. In a call setup, a through-connection from, for example, a subscriber line first occurs via the appertaining line trunk group to the central switching matrix network K. The data required for the further through-connection of the appertaining call via the switching matrix network are transmitted from the group control unit to the central control unit CP via the appertaining, aforementioned data connection. For the sake of completeness, it should also be mentioned here that there are likewise data that are transmitted from group control unit-to-group control unit not by way of the central control unit but over some other route (cf. German published application No. 31 28 365). The further call through-connection occurs via a line trunk group (potentially the same line trunk group, but usually a different line trunk group), to which end the appertaining group control unit of the respective line trunk group must be activated or, respectively, the appertaining group control units of the respective line trunk groups must be activated.

For a group control unit, therefore, there are different types of through-connection procedures in view of the call setup direction, in particular, first, through-connections from a subscriber line or trunk circuit (or a corresponding channel) in the direction to the switching matrix network K and, second, through-connections in the opposite direction. The through-connections via a switching matrix sub-network are also discriminated into those from and those to the subscriber lines, on the one hand, and, on the other hand, those from and those to trunk circuits (or, respectively, channels).

The information acceptance events and/or information transmission events executed in conjunction with these through-connection events respectively require per connection sees the respective group control unit at least once per through-connection event. The respective type of through-connection (incoming or outgoing from and to a subscriber line or trunk circuit) is the determining factor for the information processing traffic load per through-connection event which is necessarily connected with the respective recourse to the group control unit (as already stated, the group control units forward the information which they accept in conjunction with a through-connection event to the central control unit which they share, transmitting these information thereto either altered or pre-processed). The central control unit likewise outputs information to the group control unit in order to execute outgoing through-connections which are required therein and in order to output signals and control signals via the appertaining lines (subscriber lines and trunk circuits or, respectively, channels).

Every call on the part of a subscriber station and every incoming occupation of a trunk circuit (or, respectively, of a corresponding channel) therefore requires a certain work performance on the part of the appertaining group control unit. Each such work performance can be recognized in the basis of an initial switch identifier for the respective group control unit. Given a subscriber line with loop pulsing, for example, the loop closure which represents the call signal is such an initial switch identifier. Given a trunk circuit, for example, the c-lead occupation signal given incoming occupation is such an initial switch identifier. A similar case applies to connection-associated channels.

The mentioned initial switch identifiers therefore differ from one another, namely dependent on the appertaining type of line (subscriber line or trunk circuit). In conjunction with the through-connection of a sub-section and of a connection to be established, they respectively represent a corresponding measure for the information processing traffic load to be expected for the appertaining group control unit, particularly in conjunction with acceptance, processing and/or transmission of information. For the different sub-sections of connections to be through-connected, therefore, specific measures are typical in this respect, these being the same given identical sub-sections of a connection to be through-connected, but differing from one another given different sub-sections. That which applies to each of the group control units also applies in a corresponding manner for the central control unit CP. Dependent upon whether the through-connection is to be executed via the switching matrix network K is a matter of an intra-exchange call, an incoming or outgoing local call or an incoming or outgoing long-distance call, the degree of the information-processing traffic load differs per through-connection for the central control unit, namely dependent on the type of connection to be respectively established.

The central control unit CP which has already been mentioned is a central, information-processing sequential switching circuit. The decentralized control devices GP1–GPn are sub-central, information-processing sequential switching circuits. As has already been set forth above, the data exchange between the sub-central switching circuits GP1–GPn, on the one hand, and, on the other hand, the central switching circuit CP takes place via the buffer MB. Information that are to be transmitted in the direction to the central switching circuit are forwarded via the lines za, ze and h. Information that are output from the central switching circuit CP to the sub-central switching circuits GP1–GPn are transmitted via the route c.

As has already been mentioned and as is generally known in the art, the central switching circuit, of course, exhibits a limited call-handling capacity with respect to its information-processing capacity (no matter how high of a capacity it may have). This call-handling capacity relates to the number of information processing events that can be executed per time unit. The loadability of each central switching circuit is fundamentally dependent on its format (structure, program execution and instruction execution speed) and on the nature of the information processing events that are continuously transmitted thereto. As a rule, these differ in nature. They may occur mixed; the loadability therefore relates to the respectively given mix of information processing requests.

Experience has then shown that the composition of information processing events of various types can shift during the operation of a central switching circuit. For example, it can therefore occur that it is mainly local connections that are to be set up during certain times of data, whereas long-distance connections dominate at certain other times of day. Furthermore, it can occur that more short-duration calls occur at certain times of day and more long-duration calls occur at other times of day. It can also happen that more special services are utilized at certain times of day than at other times of day. In this context, one can also speak of a changing traffic spectrum which can exhibit different compositions with respect to the different types of possible connections. In addition, the proportion of occupations prematurely aborted respectively before the complete call set up can form a greater part of the total call set up events at certain times of day than at certain other times of day. In this context, one can also speak of a changing occupation spectrum with respect to the proportion and degree of completeness of the occupation attempts.

For the various reasons set forth above, the loadability with respect to the number of incoming seizure attempts of a central switching circuit is not constant. In order to optimally load a central switching circuit, it is therefore expedient to take into consideration the different loadabilities established at the various operating times due to the different pre-conditions. It is therefore advantageous to equip such control units with measuring devices for the determination of the loadability which integrate the constant constantly fluctuating occupation over time intervals that are respectively long enough in order to guarantee a determination result with adequate result precision, whereby, therefore, short-duration fluctuations do not come to bear.

A measuring device serving the above-indicated purpose can work, for example, on the basis that a central control unit generates a request signal after having respectively worked off all existing information processing requests, these control signals being supplied, among other things, to the measuring device. Over defined time intervals of identical length, for example over four seconds, the measuring device counts the number of such request signals that have arisen in the central switching circuit. The drawing illustrates a measuring device B assigned to the central switching circuit CP which is connected thereto via a line m. It therefore receives the request signal connected thereto via the line m every time such signal occurs. The measuring device B counts off the request signals in a known manner. It receives a time marking signal via the line t1 from a central time generator Zg at an interval of 4 seconds. This time marking signal means the end of one measuring time interval and simultaneously means the beginning of the next measuring time interval. The measuring device B then identifies the number of incoming request signals of the respective central switching circuit between two such time markings. When no information processing requests are present for a longer interval, then these request signals are emitted at time intervals which respectively correspond, on average, to an information processing event. Instead of or in addition to these request signals, it is also possible to report third level information processing events from the central switching circuit CP/ZW to the measuring device B, i.e. to base an identification of the loadability on these third level information processing events. Such third level information processing events can be, for example, internal check routine program executions or the like.

Within a respective measuring time interval, the measuring device B therefore counts the request signals received and forms a measured loadability value therefrom. There is also a constant loadability value in addition to this. Before initial activation of a telecommunication switching system of the type set forth herein, this is computationally identified from known initial values and is stored in a memory B2 of the measuring device B. It indicates the number of information processing events which, viewed over the long haul, are normally executed by a central switching circuit of the type set forth here. When the switching system is placed in operation, this constant value is also stored in a memory B1. The measuring device B now subtracts the measured loadability signal respectively identified from the number of request signals received per measuring time interval from the value stored in the memory B1 and, in turn, divides the difference deriving therefrom by the value stored in the memory B1. When the value "1" thereby occurs, then it may be seen therefrom that the central switching circuit CP was uninterruptedly busy with information processing events during the respective measuring time interval. This provides an indication that the central switching circuit was too heavily loaded during the appertaining measuring time interval.

The central switching circuit should only be loaded to 95%. When the division operation yields a value of 0.95 then it follows therefrom that the central switching circuit was loaded at 95% in the mentioned manner. When, however, a lower value occurs, for example 0.93, then it can be seen therefrom that the central switching circuit was only loaded at 93% in the measuring time interval, i.e. was too lowly loaded.

Depending on the result obtained from the appertaining division operation per measuring time interval, the measuring device B either emits absolutely no signal to an occupation rate counter W, given too low or, respectively, too high a load of the central switching circuit (when, therefore, the rated loadability of 95% is higher or, respectively, lower than the load of the central switching circuit actually present at the time), it emits an increase signal via a path +b or, respectively, a reduction signal via a path −b.

As set forth above, the increase signal or, respectively, the reduction signal is supplied from the measuring device B to the occupation rate counter W. A comparison value (control standard) which is explained hereinbelow is stored in the counter W. This comparison value is increased or, respectively, decreased upon receipt of the increase signal or, respectively, the reduction signal. These signals, i.e. the one or the other, respectively, are supplied from the measuring device B to the occupation rate counter W as mentioned above. All information processing requests which arrive via the line za and are forwarded via the line ze traverse the occupation rate counter. These information processing requests are a matter, in part, of initial requests and, in part, of successor requests. The switch identifiers emitted by a calling subscriber for setting up a connection are composed of an initial switch identifier (call signal) and of successor switch identifiers which arrive at time intervals that are conditioned by the nature of the respectively calling subscriber. One initial switch identifier and a plurality of successor switch identifiers therefore always belong together in conjunction with the respective call set up. In addition, successor switch identifiers in conjunction with a respective call set up can be the end of selection identifier, the answer identifier, the end identifier and the like, i.e. line indicators, as well as fee charge pulses. These switch identifiers are accepted with the assistance of a decentralized switching circuit GP1; deriving therefrom are information processing requests which, in accordance with the discrimination of the switch identifiers as initial switch identifiers and successor switch identifiers, are likewise to be discriminated, namely as initial requests and successor requests.

Information processing requests now successively arrive via the line za. A smaller portion of these are composed of initial requests and a larger portion are composed of successor requests. With respect to the various call set up operations, these information processing requests arrive unordered, i.e. mixed. They traverse the occupation rate counter W and are stored in a first in-first out (FiFo) memory. In a known manner, this FiFo memory comprises a greater plurality of memory units, whereby a respective memory unit serves for the storage of one information processing request. In response to call-in by the central switching circuit CP/CW, they are forwarded via a line h from the memory to the central switching circuit in the same sequence in which the information processing requests were forwarded to the memory via the line ze.

The occupation rate counter W then serves as a further measuring device for determining a deviation of the soon to be expected information processing work load of the central switching circuit from its call-handling capacity. Of these, the occupation rate counter W, which is traversed by all information processing requests, counts only the initial requests.

There are two possibilities for this latter type of counting. The one possibility is that a time mark is transmitted, for example every second, to the occupation rate counter via the line t2 and respectively starts or stops a counting event in the occupation rate counter W, and that a count result acquired between two respective time marks is compared to the comparison value. A further possibility is that a counter is incremented by the initial requests and is deincremented at uniform time intervals independently of the initial requests, and that the comparison value effects a number of deincrementation events which are respectively executed between two time marks in the same manner as set forth above.

A common FiFo memory is therefore provided for initial requests (initial switch identifiers) and successor requests (successor switch identifiers). In order to limit the counting operation only to the initial requests, the occupation rate counter W selects the initial requests from the information processing requests (switch identifiers) supplied to the FiFo memory. As stated, the occupation rate counter W executes the counting in successive counting time intervals that are limited by the time marks. After the expiration of a counting time interval, the time marks respectively reset into its initial position and it supplies a count result which is to be compared to a comparison value at the end of each counting time interval. This comparison value (control standard) represents a threshold value. The other possibility is that the occupation rate counter W is incremented by the initial requests and is continuously deincremented in steps. In this case, the occupation rate counter therefore has a count result at any time that is subjected to a lasting comparison event which, however is executed at least one per incrementation event and/or per deincrementation event on the basis of a threshold.

In both instances of the specific execution of the occupation rate counter W, as set forth above, the feed of initial requests (initial switch identifiers) to the FiFo memory is throttled as a consequence of the transgression of the threshold, whereby an acceptance of all successor requests (successor switch identifiers), even those respectively belonging to an initial request (initial switch identifier), is prevented. A restriction device L is provided in order to accomplish this purpose. When the counting value in the occupation rate counter W exceeds the threshold, i.e. the comparison value, then the occupation rate counter W emits a reduction signal to the restriction device L by way of the line −V. When the transgression of the threshold by the count value has been eliminated, then the occupation rate counter emits an increase signal +v to the restriction device L. The emission of an increase signal or a reduction signal from the occupation rate counter W to the restriction device L occurs at uniform time intervals of, for example, one second.

The restriction device L then serves the purpose of effecting that a defined percentage of call set up attempts is rejected in the line trunk groups LTG1 ∝ LTGn. The quantity of incident information processing requests should thereby be reduced. To this end, a memory Zi is provided in each of the decentralized switching circuits GP, this memory Zi storing the percentage of call signals which is to be rejected upon recognition of information processing traffic overloads in order to defend against such overloads. Percentages of 05%, 25%, 33.3%, 50% and 75%, can be stored, for example, in this memory. These percentages indicate which portion of the incoming calls is to be subjected to nonacceptance. What is to be understood by non-acceptance is that, upon arrival of a call signal, an appropriate signal, for example a busy signal or a signal asking the caller to wait or an announcement, is sent to the appertaining subscriber, and that the acceptance or forwarding of selection identifiers output by the subscriber is prevented. Instead of a percentage of call signals to be subjected to non-acceptance, it would be just as readily possible to provide a percentage to all call signals to be accepted, i.e. to store a "forward quota". The non-acceptance of call signals on the basis of a non-acceptance means can occur in accordance with the countdown principle, whereby, therefore, a calling subscriber can be randomly successful or unsuccessful with his call set up attempt, or a distinction can be made between the calls from subscribers and lines of various priority cases.

Data concerning the respective percentage of initial requests to be non-accepted or, respectively, forwarded are transmitted from the restriction device L to the decentralized switching circuits GP and are continuously stored therein. Such a transmission of these data occurs either continuously, or only when an increase or decrease in this percentage is to be reported. The arrival of data reporting an increase or, respectively, decrease in the non-acceptance percentage, the stored percentage is reduced or, respectively, increased in steps in the memory switching device Zi provided in the decentralized switching circuits for the storage of percentage.

It is now provided that these data serving the purpose of reporting the increase or the decrease of the percentage are transmitted from the central switching circuit to the decentralized switching circuits and, in the latter, to the memory switching device Zi in common with the data, particularly the setting and control information for the execution of the switching procedures transmitted from the central switching circuit to the decentralized switching circuits. To this end, the restriction device L is connected to the central switching circuit CP/ZW via a line d. By way of this path, it reports data regarding the valid percentage or, respectively, the percentage tp to be set. The central switching circuit CP/ZW attaches these data, which are respective data having relatively little informational content, to the setting and control information serving for the execution of the switching procedures which, therefore, are continuously transmitted from the central switching circuit to the decentralized switching circuits. It is therefore not necessary to have to start separate message transactions for the transmission of data concerning the respective percentage, rather these data accompany the setting and control information for the call set up. Since the data exchange with the various line trunk groups varies in intensity, the data reporting the respective percentage are therefore transported particularly rapidly to those decentralized switching circuits which are involved in a particularly active data exchange with the central switching circuit. In that the mentioned percentage is stored in the centralized switching circuits, during the full operation of a load non-acceptance phase having an unchanging load non-acceptance, it is not necessary to transmit data regarding the same from the central switching circuit to the decentralized switching circuits, this data relating to the information processing traffic overload. When information processing traffic overloads occur proceeding from one line trunk group, then the appertaining restriction data are communicated first to this line trunk group.

The information-processing requests (switch identifiers) therefore arrive in succession in their respective chronological sequence mixed with respect to various series (a series always corresponds to a call set up procedure). They indicate their respective series affilitation by way of a source address which accompanies every switch identifier. This source address indicates the respective allocation to the subscriber line circuit of a calling subscriber or to a connector set or to a line terminator or the like, i.e. to one of the mentioned call-associated switching facilities.

It is provided that the control of the comparison value stored in the memory S of the counter W is temporarily ended after a successful parrying of an information-processing traffic overload given a decrease of a corresponding back up of information-processing requests and after a return of the non-acceptance percentage output by the restriction device L to the switching circuit CP/ZW (for the above-described distribution to the decentralized switching circuits GP) to the value zero and after the lapse of a fixed minimum waiting time of, for example, twelve seconds measured from the time of this reset which, therefore, higher values are always set for the measured loadability value which determines the loadability, this due to the drop in the actual load. This control of the stored comparison value occurred on the basis of the measured loadability result acquired from the measuring device B and on the basis of the division result formed therefrom.

An indication device E is provided for measuring off the aforementioned minimum waiting time. The indication device E is connected to the output of the restriction device L via a line e. By way of the line e, the indication device E receives the non-acceptance percentage respectively identified by the restriction device L. Further, the indication device E is connected to the time generator Zg via a line t1. When no information processing traffic overload has been present over an interrupted, longer interval, for example 12 seconds, i.e. when the non-acceptance percentage has also uninterruptedly had the value zero for this time, then the loadability measurement is deactivated. Respectively beginning at the time of the resetting of the non-acceptance percentage in the restriction device L, the indication device E therefore monitors whether this percentage remains at the value zero during the minimum waiting time which is measured beginning at this time. When this condition is met, then the indication device E outputs an appropriate signal to the occupation rate counter W via a signal path w.

Likewise, at the beginning of the minimum waiting time, i.e. whenever the non-acceptance percentage specified by the restriction device L has reached the value zero, the indication device E transmits the signal to the occupation recounter W via a signal path w, this signal identifying the beginning of a potential minimum waiting time. The effect of this signal in the occupation rate counter W is that the comparison value currently stored in the memory S is transferred to an auxiliary memory s and is stored therein. A comparison value which may potentially have already been stored therein earlier is thereby erased at the same time.

In accordance with the definition, of course, the non-acceptance percentage is uninterruptedly equal to zero during the minimum waiting time. Non-acceptances would therefore not necessary during this time. As a rule, this is caused by a corresponding drop in load. During the minimum waiting time, this drop in load has then seen to it that the comparison value of the counter W stored in its memory S has been constantly adjusted with a positive tendency, i.e. has gradually assumed a relatively high value.

What this means, practically, is that, given a renewed increase in the incoming flow of information processing requests or, respectively, of initial switch identifiers, a relatively high number of the same would be initially accepted, i.e. non-acceptances would not yet initially occur, in particular until, finally, proceeding from the measuring device B, the regulation of the comparison value controlled by the loadability measurement would have again reduced this comparison value to such a level that on the basis of comparison values, again becoming correspondingly lower, the non-acceptance percentage again assumes definitive values, i.e. rises proceedings from the value zero. This, however, would lead to a temporary overload of the central control unit. In order to avoid this effect, it is provided in the manner indicated that a comparison value in the memory S of the counter W which is established given a drop of the non-acceptance percentage to the value zero is transferred into the auxiliary memory s of the counter W so that it can be transferred back from the auxiliary memory s into the memory S at a later time, in particular after the conclusion of a load-regulating phase and an ideal phase of the non-acceptance events, and after a renewed initialization of the non-acceptance events.

After a deactivation of the comparison value regulation, the counter W works with an initialization comparison value that is higher than the stored comparison value in the memory S. This is the "special" threshold that has already been mentioned above. A renewed initialization of the comparison value regulation and of the formation of the non-acceptance percentage data can be produced by two different causes. When the occupation rate counter W, which counts the initial switch identifiers, again reaches a higher value, in particular a count value that is equal to or higher than the threshold, then the evaluation of the destination or determination results applied by the measuring device B is again started. This also occurs when the degree of filling of the FiFo memory which stores both initial requests and successor requests reaches or exceeds a defined limit value. The time interval between initialization and deactivation represents a load-regulating phase; during this phase, the current information processing work load is situated in a load-regulating range which encompasses the full load and overload range.

It is provided that the initialization value stored in the memory S is defined as such a high level that the initialization only occurs when, given a merely brief-duration overload, this quite substantially exceeds the loadability. In this case, the initialization occurs extremely on the basis of a short turn. When, by contrast, the newly-occurring overload only slightly exceeds the loadability limit, then it takes longer until the initialization begins. A limit value stored in the measuring device F of the FiFo memory is provided for this purpose. When the memory steadily fills, given a relatively slight, but long-lasting overload, the initialization occurs in that the degree of filling of this memory has reached or exceeded the limit value. The delay time is thereby approximately inversely proportional to the extent of the overload and is longer than the reaction time of the counter W to a suddenly-occurring, high overload. The initialization value stored in the memory S and the limit value stored in the measuring device F of the FiFo memory therefore augment one another, in effect, in particular such that the initialization value stored in the memory S takes care of an optimally rapid recognition of a high overload and the limit value stored in the measuring device F takes care of a reliable recognition of even a slight overload. In addition to being caused by the supply of information processing requests from the decentralized switching circuits GP1–GPn (excess external offering), the load on the central control unit is also caused by internal executions, for example switching sequences for the purpose of testing technology and/or protection techniques (excess internal offering).

In idle phases of non-acceptance operations, therefore, both the initialization value and the limit value serve in the indicated manner to recognize an increase in the load of the central switching circuit correctly, whereby the magnitude of a load discontinuity (recognizable slight overload by way of the initialization value) and/or a longer-lasting, relatively slight overload (recognizable by way of the aforementioned limit value) can be determinant. Both values are stored in a manner set forth above in the memory S of the occupation rate counter W or, respectively, in the measuring device F of the FiFo memory. It is provided in accordance with the present invention that the value stored in the memory S, i.e. the threshold which determines the initialization of the transmission of the non-acceptance data, as well as the control standard serving the purpose of comparison, given an active overload, are continuously adjusted by way of a measured loadability result acquired in a time interval between the decrease of the non-acceptance rate to the value zero and renewed transgression of this threshold, i.e. in idle phases of the non-acceptance operations. These loadability measurements in the idle phases of the non-acceptance operations are likewise executed with the assistance of the measuring device, as well as with the assistance of the occupation rate counter W. Measuring time intervals which are dimensioned adequately long for the compensation of short-term fluctuations in this regard, in order to keep the remaining measuring error adequately small, are defined for these loadability measurements which therefore chronologically fall outside of the load-regulating phases. The number of information processing requests, particularly only initial switch identifiers, incoming per measuring time interval is then identified within each measuring time interval. With the assistance of the measuring device B, further, the current load of the central switching circuit caused by the information processing requests is measured per time interval in the manner already set forth. The ratio of a traffic load maximally allowed during this measuring time interval to the actual traffic load resulting in this measuring time interval from the incoming information processing requests is thereby formed. On the basis of this ratio, formed per every measuring time interval by the measuring device B, the identified number of information processing requests, in particular only initial switch identifiers, incoming per measuring time interval, is then increased based on the measure of this ratio and is used for ongoing adjustment of the threshold and of the control standard in the memory S of the occupation rate counter. It can, moreover, be provided that the initial value for the control normal be increased by, for example, 10% or 20%, whereby the non-acceptance is accordingly delayed until a later time.

The description shall now return to a presentation of the events within the load-regulating phases. In such a phase, the measuring device B therefore supplies a determination result relating to the loadability of the central control unit, this determination result acquiring the loadability which, for the reasons set forth above, always fluctuates somewhat and has its values integrated over time intervals which are respectively likewise sufficiently long in order to guarantee that this determination result is adequately precise. This determination result is expressed in the measured loadability value which is constantly and newly stored in the memory B1 and is further expressed in the increase and reduction signals transmitted to the occupation rate counter W and in the comparison value which is thereby continuously regulated in the occupation rate counter W.

As has also been set forth above, at the end of a load-regulating phase, i.e. when the counter results periodically acquired from the occupation rate counter W becomes continuously smaller, i.e. from the counting result-to-counting result, a value thereby existing at the moment when the comparison value currently stored in the memory S is reached, or fallen below, this value therefore simultaneously corresponding to the comparison value and the most-recent count value, is stored in the auxiliary memory s at the beginning of a minimum waiting time and is transferred therefrom into the memory S when this minimum waiting time has expired. This value remains stored in the memory s of the occupation rate counter after the conclusion phase initiated by an initialization. This value serves as an initial value for the identification of the starting threshold and of the control standard until, after the end of the first measuring time interval, a new initial value is present and the value stored in the memory S is overwritten by the latter. As a result of the ongoing adjustment of the aforementioned thresholds, given an inactive overload defense, a noticeable shortening of the minimum time waiting is also allowable, whereby a quasi-justified, longer maintaining of the overload-parrying condition is substantially shortened.

Although I have described my invention by reference to a particular illustrative embodiment thereof, many changes and modifications of the invention may become apparent to those skilled in the art without departing from the spirit and scope thereof. I therefore intend to include within the patent warranted hereon all such changes and modifications as may reasonably and properly be included within the scope of my contribution to the art.

I claim:

1. In a circuit arrangement for regulating the load of a telecommunications switching system, in particular a telephone switching system, of the type comprising information-processing central switch devices and decentralized switching facilities connected thereto and continuously supplying thereto series of information-processing requests in which the first information-processing request of each series is composed of an initial switch identifier, the improvement therein comprising:
   counting means storing a threshold count and operable to count initial switch identifiers;
   adjusting means connected to said counting means and operable in response to measured loadability results acquired during a predetermined time interval to adjust the threshold count;
   for continuously acquiring the measured loadability results, loadability measuring means defines measuring time intervals and identifies initial switch identifiers incoming during each time interval, the measuring time intervals being sufficiently long to compensate brief load fluctuations and maintains a small measuring error, and operates said adjusting means to adjust the threshold count on the basis of the ratio of a maximally allowable traffic load and the actual measured traffic load during a measuring time interval; and means connected to said counting means for transmitting non-acceptance data to the decentralized switching facilities in response to transgression of the threshold count.

2. In a circuit arrangement for regulating the load of a telecommunications switching system, in particular a telephone switching system, of the type comprising information-processing central switch devices and decentralized switching facilities connected thereto and continuously supplying thereto series of information-processing requests in which the first information-processing request of each series is composed of an initial switch identifier, the improvement therein comprising:
   a time signal generator operable to produce cyclic timing pulses indicating the end of a measuring interval and the beginning of a next measuring interval;
   measuring means for receiving processing requests, said measuring means connected to said time signal generator including counting means operable to count the number of processing requests per measuring interval as a load value, said measuring means comprising first and second memories each storing a predetermined loadability value and calculating means operable to subtract the measured load value from the value stored in said first memory and divide the result by the value stored in said second memory and produce a first increase signal in response to a division result which is less than a predetermined load factor and a first decrease signal in response to a division result which is greater than the predetermined load factor;
   an occupation rate counter for receiving processing requests connected to said time signal generator and operable to count only initial processing requests received during a predetermined counting interval, said occupation rate counter including a third memory storing a threshold value connected to receive and be adjusted by said first increase and decrease signals of said measuring means, said occupation rate counter including means for generating a second decrease signal when the threshold has been transgressed and a second increase signal when the count falls below the threshold;
   a first-in/first-out memory connected between said occupation rate counter and said measuring means for delayed transmission of processing requests from said occupation rate counter to said measuring means;
   a restriction device connected to said occupation rate counter and responsive to said second increase and decrease signals, respectively, to indicate the number of processing requests to be accepted; and central switching means connected to said restriction device and to said measuring means and to said first-in/first-out memory and to the decentralized switching facilities for controlling signal flow therebetween.

3. In a circuit arrangement for regulating the load of a telecommunications switching system, in particular a telephone switching system, of the type comprising information-processing central switch devices and decentralized switching facilities connected thereto and continuously supplying thereto series of information-processing requests in which the first information-processing request of each series is composed of an initial switch identifier, the improvement therein comprising:

a time signal generator operable to produce cyclic timing pulses indicating the end of a measuring interval and the beginning of a next measuring interval;

measuring means for receiving processing requests, said measuring means connected to said time signal generator including counting means operable to count the number of processing requests per measuring interval as a load value, said measuring means comprising first and second memories each storing a predetermined loadability value and calculating means operable to subtract the measured load value from the value stored in said first memory and divide the result by the value stored in said second memory and produce a first increase signal in response to a division result which is less than a predetermined load factor and a first decrease signal in response to a division result which is greater than the predetermined load factor;

an occupation rate counter for receiving processing requests connected to said time signal generator, said occupation rate counter incremented by initial processing requests received and independently deincremented by time signals during a predetermined counting interval, said occupation rate counter including a third memory storing a threshold value connected to receive and be adjusted by said first increase and decrease signals of said measuring means, said occupation rate counter including means for generating a second decrease signal when the threshold has been transgressed and a second increase signal when the count falls below the threshold;

a first-in/first-out memory connected between said occupation rate counter and said measuring means for delayed transmission of processing requests from said occupation rate counter to said measuring means;

a restriction device connected to said occupation rate counter and responsive to said second increase and decrease signals, respectively, to indicate the number of processing requests to be accepted; and central switching means connected to said restriction device and to said measuring means and to said first-in/first-out memory and to the decentralized switching facilities for controlling signal flow therebetween.

* * * * *